Oct. 29, 1968     O. G. KOPPIUS     3,407,475
TECHNIQUE FOR FABRICATING EDM ELECTRODES
Filed Feb. 8, 1967
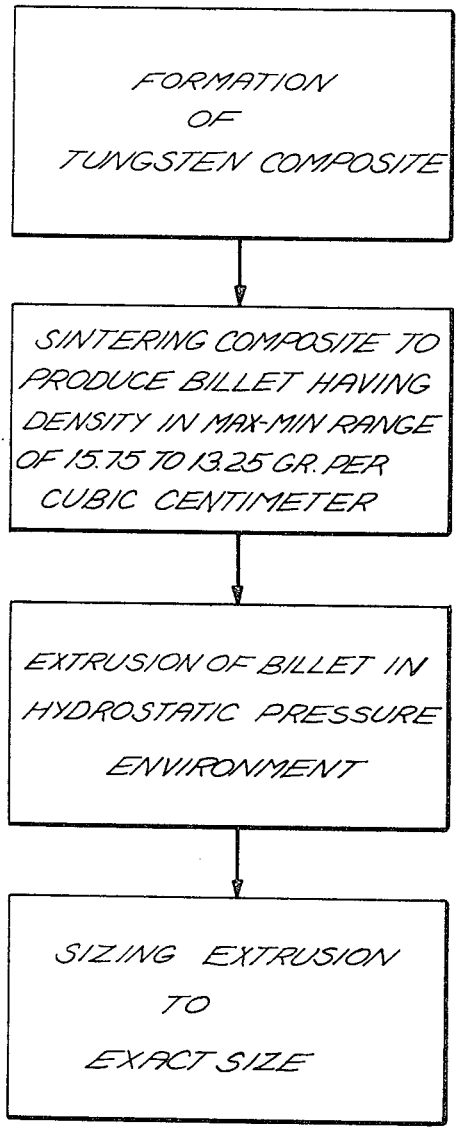
FABRICATION OF EDM ELECTRODE
INVENTOR.
OTTO G. KOPPIUS
BY
ATTORNEY

United States Patent Office 3,407,475
Patented Oct. 29, 1968

3,407,475
TECHNIQUE FOR FABRICATING EDM ELECTRODES
Otto G. Koppius, Florence, Ky.
(990 Linden St., Clermont, Fla. 32711)
Filed Feb. 8, 1967, Ser. No. 614,606
7 Claims. (Cl. 29—420.5)

ABSTRACT OF THE DISCLOSURE

Electrical Discharge Machining Electrodes (EDM) are fabricated from tungsten-copper, tungsten-silver, and other composites having excellent EDM wear properties but which are normally of poor ductility. These composite materials can, within certain density limits, be made ductile and hence extruded through dies at high pressure to the desired electrode configuration.

---

This invention relates to techniques for forming EDM electrodes and more particularly to a technique wherein materials having good EDM wear properties, but which are ordinarily brittle, can be made ductile and extrudable in a pressure environment.

The electrical discharge machining technique, commonly referred to as "EDM" is based on the controlled erosion of metal arising from a rapidly recurring spark discharge impinging on the surface being machined. The workpiece melts in a small area surrounding the point at which it is struck by the spark, and a portion of the liquefied or vaporized metal is expelled. This is accomplished by submerging the workpiece and the spark electrode or tool in a dielectric fluid which is circulated to flush away the eroded swarf.

Electrical discharge machining is a highly preferred method for forming accurate round holes, irregular shaped holes, slots and cavities in metals of all types. The principle limitation of this method for purposes of producing parts on a large scale lies in the cost of the EDM electrodes. Should it be possible to fabricate EDM electrodes, particularly those with a good wear ratio, cheaply and accurately in large quantities, then the EDM process could become a universal manufacturing tool.

At present, EDM electrodes are made by machining methods, and since the electrode is slowly eroded away in the course of the EDM procedure, the cost of machined electrodes is a very significant factor in the overall cost of the procedure. Heretofore, a few electrodes have been made by hydraulic extrusion and/or casting, but in general these have been fabricated from materials having a poor EDM wear rate, such as copper, zinc alloys, etc. None of the commercially available copper and/or silver tungsten EDM electrode materials, such as those currently made by Mallory, Firth Sterling, Mohr-Wear, and others will extrude hydraulically. By hydraulic extrusion is meant an arrangement where the fluid pressure is used only to push a ram which in turn forces the billet through the die.

Accordingly, the main object of this invention is to provide a technique for fabricating EDM electrodes of tungsten-copper, tungsten-silver, tungsten silver/copper and tungsten-zinc/copper composites, all of which have excellent EDM wear properties but which are ordinarily brittle or at best poorly ductile, which composites can within certain density limits be made ductile and thereby be made to extrude in a pressure environment.

This object is accomplished, for example, with tungsten-copper composites within the maximum-minimum density range 15.75 to 13.25 grams per cubic centimeter which have been discovered to be ductile under the proper pressure environment. The density range 15.5 to 14.5 grams per cubic centimeter has been found to be optimum for both extrusion and EDM performance. The tungsten composites must be extruded under a hydrostatic pressure environment. That is the composite must be under pressure going through the die, and most important, it must remain under pressure after the extruded product leaves the die. The environmental pressure must exceed at all times the brittle-ductile transition. The minimum environmental pressure is 50,000 p.s.i. and the maximum is about 300,000 p.s.i. for the proper extrusion of tungsten composites. The upper limit is set by the safety requirements of the equipment which should be at least 450,000 p.s.i.

The invention makes it possible to extrude EDM tungsten composite electrodes of many different cross sections including rounds, tubes, and irregular shapes when using the fluid-to-fluid high pressure environment technique.

For a better understanding of the invention as well as other objects and further features thereof, reference is made to the accompanying drawing which is a flow sheet of a technique in accordance with my invention.

Copper and/or silver tungsten composites pressed and sintered within a certain limited density range can be high pressure fluid-to-fluid extruded into commercial usable shapes. In fluid extrusion, high pressure liquid acts at once on all surfaces of the billet except the end in contact with the die opening. High frictional losses, which occur when the load is applied only at the top, are avoided. Extrusion by ram pressure directly on the billet requires a close fitting container to prevent buckling or barreling. Friction losses can be very high especially with long billets. In fluid extrusion, however, any length of billet can be extruded without affecting the load required, because the billet does not touch the container except at the conical entry to the die. Since there is no contact between the container and the billet, the shape of the billet has no effect on the process and it follows that round or irregular shaped billets can be extruded through the same die.

Likewise, the shape of the extrusion die has no effect on the process and irregular or contoured shapes can be extruded with equal ease. This fact permits one to extrude long lengths of contoured EDM-shaped electrodes which is an important economical feature of the process. In conventional extrusion dies rarely have conical entry angles of less than 120 degrees. They are so designed because the high pressure exerted in one direction dictates maximum die strength. In fluid extrusion the entire billet can be pushed through the die without loss of material regardless of the size of the entry angle. The large frictional forces of the conventional extrusion are avoided. A thin film of lubricant follows the billet through the die, and the high pressure fluid may also support the die on the outside. It is therefore possible to use small angle dies with thin walls. Further, the thin film of lubricant reduces die wear to a negligible value. Finally, and most important, the extruded material has the exact shape and tolerances of the die.

Experimentally, it has been found that none of the copper and/or silver tungsten composites can be extruded by the simple fluid extrusion process described hereinabove. To be sure the composite can be extruded through the die, but the resulting product will be cracked and distorted. The material coming out of the die breaks off in layers and looks very much like "cracked waffles." In this state the material is useless as EDM electrodes.

It has been found that the composite must be extruded into a high pressure environment in order to avoid cracking. It is known that the transition from brittle to ductile behavior occurs as the temperature increases. But what is not well known by metallurgists is the fact that increase in pressure also provides a brittle to ductile transition. Tests of materials carried out under high pressure show, however, that brittle materials may under suitable conditions be brought into the plastic state. The problem of extruding copper and/or silver tungsten EDM electrode material is one of making a suitable combination of copper and/or silver tungsten that becomes ductile within a pressure range that can be produced economically and then finding a suitable pressure environment in which this material can be maintained ductile and extruded. This in essence is the underlying principle of the present invention.

Simple tensile tests on specific copper and/or silver composites, which will be described later, show that at room temperature this material is 93.5% ductile at a test pressure of 428,000 p.s.i. The ultimate tensile strength under pressure was found to be 115,000 p.s.i. The ductility is given as percent reduction in area. A pressure of 428,000 p.s.i. is not extraordinarily high and is a value that can be used commercially. As was indicated previously such composite material can not be extruded successfully from a pressure of 428,000 p.s.i. to atmospheric pressure. The extrusion must be done in a pressure environment. The lowest possible pressure environment found was 50,000 p.s.i. and the maximum pressure was of the order of 300,000 p.s.i. Most extrusions were performed at an environmental pressure of about 200,000 p.s.i.

It is not feasible to give specific values of the environmental pressures since this is determined by the complexity of the shape of the extrusion die, and the reduction in area of the composite billet passing through the die. In all cases however the pressure must be sufficiently high for the composite to remain ductile. For example, a complicated extrusion of, say, an airfoil with a hole through it requiring a 10% reduction in area required a pressure environment of 300,000 p.s.i. for the composite material to remain ductile. Then, the loading fluid pressure forcing the billet through the die had to be increased to 450,000 p.s.i. the maximum safe pressure of the equipment. Therefore the net loading pressure forcing the billet through the die is the difference or 150,000 p.s.i. less the frictional forces.

In other words, experimentally one has a total fluid pressure of 450,000 p.s.i. on the billet entering through the die, and a pressure of 300,000 p.s.i. on the exit side of die into which the extruded material flows. Thus the environmental extrusion pressure is 300,000 p.s.i. This is an extreme condition required for complicated extrusions. The fact that these specific copper and/or silver composites show a ductility of 93.5% at 428,000 p.s.i. does not imply that full reduction in area has to be completed in one step. In fact, it is more economical to perform the reduction in steps by the use of several dies with decreasing areas. Practically, it has been found that it is best to make about 90% of the reduction in area on the first extrusion, then 90% of the reduction of the remaining area on the next extrusion, and finally a sizing extrusion to the exact size required. All three steps require a different environmental extrusion pressure. For most extrusions this pressure increases after each step.

One of the critical variables controlling successful fluid to fluid extrusion is lubrication between the die and billet. Among lubricants suitable for this purpose are Pennsylvania Oil (SAE 30 and 10W), Teflon, oil plus molybdenum disulfide, transformer oil, gasoline, water and others.

The specific copper-tungsten composites that show the amazing ductility and a good EDM wear rate are those having a maximum-minimum density range between 15.75 and 13.25 in grams per cubic centimeter. The most desirable density range lies between 14.5 to 15.5 in grams per cubic centimeter. The latter range corresponds to a composition of about 30/70 copper-tungsten by weight. The density of the composite is specified, that is, both the copper and tungsten together rather than the percent of theoretical density of the tungsten, as is usual. The reason for this is that it has been found that there appears to be little difference as far as the extrusion conditions are concerned whether the composite is made by premixing the copper and tungsten powders, then pressing and sintering, or whether the tungsten powder is first sintered and then copper-impregnated, as in the Holtzclaw Patent 3,303,559.

Further, it has been found that there is little or no difference in the extrusion conditions whether the copper is replaced by silver, or only partially replaced by silver, or whether zinc is added to copper as disclosed in U.S. Patent 3,303,559 to Holtzclaw. The maximum-minimum density range as well as the optimum density does change when copper is replaced by silver since silver has a higher density. The shift is upwards by about 0.5 units. In the case that 15% of the copper is replaced by zinc the density shift is about the same, but lower. As indicated previously the maximum-minimum density range for copper-tungsten lies between 15.75 and 13.25. At a density of 15.75 the copper-tungsten composite is only about 10% ductile at 450,000 p.s.i. and the material is just workable. Below a density of 13.25 the composite becomes more ductile but the EDM wear rate also drops rapidly and the material has less value for this purpose.

As far as the composite material is concerned, the most critical variable is uniformity. To obtain proper fluid-to-fluid extrusion there must be no voids. The manner of ensuring the absence of voids in making the composite blank is disclosed in said Patent 3,303,559. Composites containing voids extrude erratically as they behave as if the material becomes very brittle and as a consequence the extruded product cracks. It is assumed that such porous material is filled with the high pressure fluid during extrusion and as a consequence the brittle-ductile transition point is never reached. Below a density of 13.25, composite materials of copper-tungsten are very difficult to make uniform and many samples actually shown less ductility because they are slightly porous.

All fluid-to-fluid extrusion tests of tungsten composites were made at room temperature. To check the effect of temperature a series of tests were run at 200° C. The change in temperature has a marked effect on the pressure brittle-ductile transition. In some instances it lowered the environmental pressure by about 100,000 p.s.i. over that obtained at room temperature. The minimum environmental pressure of 50,000 p.s.i. was established by the temperature test. The difficulties encountered in running the equipment at this temperature does warrant the advantages of a reduced environmental pressure.

While there has been shown a preferred technique in accordance with the invention, it is to be understood that changes may be made therein without departing from the essential concept underlying the invention as defined in the annexed claims.

What I claim is:

1. A technique for fabricating an electrical discharge machine electrode of a desired configuration, comprising the steps of:
   (a) forming a composite of tungsten particles intermingled with particles of at least one metal chosen from the class consisting of copper, silver and zinc;
   (b) pressing and sintering the composite to produce a billet having a maximum-minimum density range of 15.75 to 13.25 grams per cubic centimeter, said billet being normally brittle; and
   (c) subjecting said billet to fluid-to-fluid extrusion in a die having the desired configuration in an environment in which hydrostatic pressure is applied before entering and upon emerging from the die in a pressure range of about 50,000 p.s.i. minimum to about 300,000 p.s.i. maximum in which the normally brittle billet is rendered ductile.

2. A technique as set forth in claim 1, wherein said composite is tungsten-copper.

3. A technique as set forth in claim 1, wherein said composite is tungsten-silver.

4. A technique as set forth in claim 1, wherein said composite is tungsten-silver/copper.

5. A technique as set forth in claim 1, wherein said composite is tungsten-zinc/copper.

6. A technique as set forth in claim 1, wherein said density range is 15.5 to 14.5.

7. A technique as set forth in claim 1, wherein the environmental pressure is 200,000 p.s.i.

References Cited

UNITED STATES PATENTS

| | | | |
|---|---|---|---|
| 2,558,035 | 6/1951 | Bridgman | 72—60 |
| 3,069,757 | 12/1962 | Beggs | 29—182.1 |
| 3,153,163 | 10/1964 | Foldes | 29—182.8 X |
| 3,220,199 | 11/1965 | Hänlein | 29—420.5 X |

CARL D. QUARFORTH, *Primary Examiner.*

A. J. STEINER, *Assistant Examiner.*